United States Patent [19]

Brown

[11] 4,046,658

[45] Sept. 6, 1977

[54] PROCESS FOR ELECTROCOATING AMINIMIDE CONTAINING COMPOSITIONS

[75] Inventor: William B. Brown, Birmingham, Mich.

[73] Assignee: General Motors Corporation, Detroit, Mich.

[21] Appl. No.: 604,950

[22] Filed: Aug. 15, 1975

[51] Int. Cl.² .............................................. C25D 13/06
[52] U.S. Cl. ..................................................... 204/181
[58] Field of Search ......................................... 204/181

[56] References Cited

U.S. PATENT DOCUMENTS

| | | | |
|---|---|---|---|
| 3,527,802 | 9/1970 | Slagel | 260/561 |
| 3,773,729 | 11/1973 | Wakimoto et al. | 204/181 |
| 3,853,803 | 10/1974 | Anderson et al. | 260/29.6 TA |

*Primary Examiner*—Howard S. Williams
*Attorney, Agent, or Firm*—Jack I. Pulley

[57] ABSTRACT

In accordance with a preferred embodiment of this invention, a decorative and protective coating is electrodeposited on a negatively charged metallic substrate from an acidic aqueous dispersion. The dispersed particles contain a film forming addition polymer, copolymer or mixtures thereof. This addition polymerization reaction product has occasional but randomly distributed pendent aminimide and pendent hydroxyl functionalities. The hydroxyl and the aminimide functionalities are present in about equal amounts. Once deposited, the coating is cured at a temperature of about 120° C. or above.

4 Claims, No Drawings

PROCESS FOR ELECTROCOATING AMINIMIDE CONTAINING COMPOSITIONS

FIELD OF THE INVENTION

This invention relates to aminimide-containing electro-depositable polymer compositions and method of depositing same.

BACKGROUND OF THE INVENTION

When a colloidal electrolyte is dispersed in an aqueous medium and an electric potential is applied thereto, the charged particles will migrate to the electrode having the opposite polarity. This process is called electrophoresis and forms the basis for the newly developing art of electrophoretic coating. This area has received considerable attention during the past few years, and the bulk of the effort has been directed toward anodic deposition processes. Cathodic deposition is so new that in the year 1970 R. L. Yates was able to say in a text called *Electropainting* published by Robert Grapper, Limited, on page 13 that "In all electropainting processes hitherto reported, the particles carry a negative charge and migrate towards the anode." However, recent disclosures such as U.S. Pat. Nos. 3,853,803 and 3,862,894 describe cationic systems. The 803 reference teaches the use of an interpolymer of an acrylic acid monomer and amino-alkyl monomer. The 894 reference discusses a nonaqueous dispersion of acrylic polymers which contain a basic nitrogen atom and which will deposit at the cathode.

In addition, efforts to develop the cationic process have been reported in foreign literature. For example, two German patents, Offenlegungsschrift No. 2,237,114 and Offenlegungsschrift No. 2,252,536 disclose such processes; the first of which employs a polymer containing a quaternary ammonium salt which acts as a zwitterion. When placed in an acidic dispersion the zwitterion assumes a positive charge which causes the resin particles to migrate towards the cathode when an external electric field is imposed.

Typically, metallic substrates are coated to decorate and to prevent corrosion; however, in anodic electrophoretic deposition processes, the coating is deposited in an oxidizing environment which activates the metal and may even begin to oxidize it during the coating process. To eliminate this counterproductive aspect of the presently used anodic electrophoretic processes, the efforts which led to the subject invention were directed toward the more desirable cathodic deposition techniques which tend to passivate the surface and reduce the tendency of the metallic substrate to corrode. It is even possible that at the cathode, oxidized portions of the substrate may be electrochemically reduced to the pure metal.

OBJECTS OF THE INVENTION

It is an object of my invention to provide a non-neutral dispersion of electrodepositable colloidal particles wherein the particles contain film forming polymers, copolymers or mixtures thereof. Polymers in this composition contain occasional but randomly distributed pendent aminimide functionalities and pendent active hydrogen functionalities. The aminimide functionalities provide the net charge to the dispersed particles, which charge is necessary for obtaining a stable dispersion and for the migration of the particles to the deposition electrode; and in combination with the active hydrogen functionalities, the aminimide groups cross-link the final coating composition.

It is a further object of my invention, to provide a method of electrodepositing a thermosetting or thermoplastic polymer coating onto a conductive substrate from a stable non-neutral aqueous dispersion of charged particles formed from a polymer, copolymer or mixtures thereof, which composition contains pendent aminimide functionalities and pendent active hydrogen functionalities. The aminimide functionality serves to provide the net charge to the dispersed particles. This charge is necessary to both the formation of a stable dispersion and to the migration of the dispersed particles to the deposition electrode. In addition, the aminimide provides the means to cross-link the coating during the postdeposition baking step. During this process, the aminimide thermally decomposes leaving a pendent isocyanate functionality which then reacts with the pendent active hydrogen functionality on a nearby polymer chain forming a cross-linking bridge therebetween. In accordance with my method, suitably shaped electrodes are placed in direct contact with the dispersion and a constant voltage of at least 30 volts is applied thereto. Under the influence of the applied voltage the charged particles migrate to and are deposited on the electrode having the opposite polarity. After a period of from about 1 to about 4 minutes, the now coated electrode is removed, dried and cured at a temperature of about 120° C. or above.

SUMMARY OF THE INVENTION

These and other objects are accomplished in accordance with a preferred embodiment of my invention by first copolymerizing a major portion of an acrylic monomer such as ethyl acrylate, and minor portions of a hydroxylated acrylic monomer such as hydroxyethylmethacrylate and an aminimide containing acrylic monomer such as dimethyl (2-hydroxypropyl) amine methacrylimide. The resulting terpolymer has an acrylic backbone chain with occasional pendent hydroxyl and pendent aminimide functionalities. The aminimide group is characterized by a distinct negative and a distinct positive charge positioned on the adjacent nitrogen atoms.

The next step in the process is to form an acidic aqueous dispersion of particles formed from this terpolymer; the average particle size is typically within the range of from about 1 to about 10 microns. To form such a dispersion, it is necessary to have a non-neutral aqueous dispersing medium. In this preferred embodiment the pH is controlled within the range of from about 2 to about 6 by the addition of a compatible organic acid such as formic, acetic, propanoic and the like. In this dispersion, the hydrogen ion from the organic acid tends to associate with and to cancel the negative charge on the aminimide zwitterion thereby giving the polymer a net positive charge. Since all of the particles in this dispersion have a positive charge, they tend to repulse one another and to thereby form a stable dispersion. When an electric field is applied to this dispersion, the charge on the particles will cause them to migrate towards the cathode. Preferably, a voltage within the range of from about 30 to 100 volts is applied for a period of from about 1 to about 4 minutes.

Once a coating film has been applied, the cathode is removed from the bath, dried and then baked at a temperature of from about 120° to about 150° C. This thermally decomposes the aminimide functionality and forms a pendent isocyanate and a free amine. The isocyanate then reacts with and is bonded to the pendent hydroxyl functionality. This reaction forms a urethane cross-linking bridge between adjacent polymer chains and thus creates a durable thermoset coating.

This invention provides the practitioner with the following advantages: first, by maintaining the pH of the dispersion as near to neutral as possible without losing the dispersion's stability, it is possible to minimize the consumption of energy; secondly, the subject process allows one to electro-phoretically deposit a cross-linkable coating onto a negatively charged cathode; thirdly, by depositing the coating at the cathode, the harsh oxidizing environment of the anode is avoided and the coating is deposited in an electronically passive environment. The subject invention also provides an electro-depositable resin with superior throwing power and leveling properties. These and other advantages and objects of the subject invention will be more easily understood in view of a detailed description thereof to include specific examples.

DETAILED DESCRIPTION OF THE INVENTION

In accordance with the practice of this invention, a suitable electrodepositable composition contains a film forming addition polymer, copolymer or mixtures thereof. The monomer which when polymerized forms the subject addition polymer is hereinafter termed the film resin monomer. In addition, the term polymer will hereinafter be used to designate the film forming composition whether it be composed of polymers and/or copolymers or mixtures thereof; suitable additives such as plasticizers, pigments, etc. may also be included. The film forming polymer has occasional and randomly distributed pendent aminimide functionalities and pendent active hydrogen functionalities such as hydroxyls, epoxies, amines, amides, ureas and the like. In the most general form, a suitable composition may contain several distinct molecular species.

However, all components should be relatively compatible and miscible to prevent or at least minimize phase separation. In addition, it is necessary that each of the pendent functionalities be disposed on a molecular species which, in the final coating composition, forms an integral part of the polymer matrix. In other words, it would not be suitable to have either an aminimide or an active hydrogen group singularly disposed on small molecular species dispersed in the polymer matrix.

Each of the constituents mentioned above plays an important role in either the deposition of the subject composition or in the formation of a suitable coating, once the composition has been electrodeposited. The role of the film forming addition polymer is obvious; however, the aminimide and the active hydrogen functionalities play roles which should be more clearly defined.

The aminimide functionality plays three distinct roles in the deposition and curing of the subject composition. First, the aminimide provides the electric charge necessary to form a stable aqueous dispersion. The zwitterionic nature of the aminimide functionality is the key to this particular role. Discrete positive and negative charges, characteristic of zwitterions in general, occur on the adjacent nitrogen atoms in the aminimide functionality. Thus, when the aminimide containing composition is dispersed in an acidic aqueous solution, the hydrogen ions, released by the ionization of the acid, migrate to the negatively charged nitrogen atom and remain in the vicinity of that atom. Therefore, these ions cancel the effect of the negative charge and leave a net positive charge on the dispersed composition. Since all of the discrete particles in the dispersion have a net positive charge, they tend to repulse one another and form a stable dispersion. On the other hand, if an aminimide containing resin were dispersed in a basic aqueous medium, a stable dispersion would also be formed since the hydroxyl ions would, in effect, cancel the positively charged nitrogen atom of the zwitterion thereby leaving the dispersed composition with a net negative charge. A composition so dispersed would deposit at the anode. Secondly, by providing the dispersed particles with a net charge, the aminimide also provides the means for the particles to migrate to a charged electrode when an electric field is applied to the dispersion. Finally, once the composition has been deposited on a suitable substrate and is baked at a temperature of about 120° C. or higher the aminimide group, thermally decomposes forming an isocyanate group and an amine. The isocyanate will remain covalently bonded to whatever molecular species the aminimide group was originally attached. The isocyanate then will react with the active hydrogen functionality to form a cross-linking bridge within the polymer matrix. The exact nature of this cross-link will of course depend upon the particular active hydrogen functionality contained therein. By this series of chemical reactions, the aminimide serves to provide a cross-linked thermosetting polymer coating.

The pendent active hydrogen functionality in the subject composition, serves as a reactive point on the polymer matrix with which the isocyanate may react and form a cross-linking bridge. If the practitioner of this invention is using the preferred acrylic type film forming polymer, it would be preferable to copolymerize therein any of many well-known acrylic monomers having a pendent active hydrogen functionality such as hydroxymethyl methacrylate, hydroxyethylmethacrylate, glycidyl methacrylate and the like. This type of monomer would be preferable in an acrylic type film forming resin because compatibility and polymerization problems would be minimized.

In tailoring a depositable composition in accordance with the practice of this invention, several basic molecular variations would be suitable. The first is the composition consisting of a polymer molecule which is formed from a suitable film resin monomer or mixtures thereof and both the pendent aminimide and pendent active hydrogen functionalities are attached to this same backbone chain. These functionalities may be incorporated into the film forming polymer by several techniques such as copolymerizing the film forming polymer with small amounts of suitable monomers containing the aminimide and the active hydrogen containing functionalities or these functionalities may be grafted onto the backbone chain. In the broadest embodiment, condensation type polymers may be used, but the addition type is preferred.

In addition, several multi-molecular variations may be used in the formation of a suitable electrodepositable film forming composition; however, all molecular species within a given resin must be relatively compatible. For example, a suitable composition may contain two uniformly blended molecular species with the backbone of each being formed from a suitable film resin monomer or mixtures thereof. One of these species would contain a minor portion of pendent active hydrogen functionalities while the other species would contain a minor portion of pendent aminimide functionalities. In this variation, cross-linking bridges would be formed during the postdeposition baking step between the isocyanate (formed by the decomposition of the aminimide) on one chain and the active hydrogen group on the other chain.

In an additional, suitable variation, the film forming polymer would have only the active hydrogen functionality and uniformly dispersed throughout this matrix would be compatible and relatively short di-aminimide terminated molecules which after electrodeposition and baking would form cross-linking bridges between the pendent active hydrogen groups. Similarily, the polymer may have pendent aminimide groups, with compatible and relatively short di-hydroxy terminated or glycol type molecules dispersed throughout the matrix, the dispersed glycols would serve the same function as the di-aminimide terminated material would in the previous variation. Polyfunctional triol or aminimide may be substituted for the defunctional species described above. Again, it would be necessary for the various molecular species to be relatively compatible to prevent the formation of separate phases.

The particular molecular variation selected for a given application would depend on many parameters and would affect many features of the coating process and properties. For example, with certain coating compositions, copolymerization problems may dictate a given variation, while with other film forming resins, it may be necessary to choose an alternative variation to maintain acceptable film properties or processing conditions. For example, it is apparent, from the one molecule variation, that in the postdeposition curing step, the mobility of the active isocyanate and active hydrogen containing groups would be relatively low and therefor the rate of cross-linking or cure would be slow when compared to one of the multi-molecular variations described above. Therefore, in a process which demanded a fast curing coating, the one molecule variation would not perform well.

An important parameter in the deposition process of a suitable composition is the relationship involving the glass transition temperature of the depositing resin, the temperature of the aqueous dispersion, and the temperature of the deposition surface. If the tempera of this surface is much below the glass transition temperature of the depositing resin, the composition would exhibit very poor leveling properties and the process would have very low throwing power. This is understandable since in a glassy state, the depositing resin would be hard and would not readily flow; therefore leveling would occur very slowly, if at all. In the extreme, the resin would deposit as discrete particles on the surface and not form a continuous film. Comparatively, if the depositing resin has a glass transition temperature which is much below the bath temperature, the resin would tend to be very tacky and it would be difficult to establish a stable dispersion as the particles will tend to coalesce in the bath.

Ideally, the depositing resin should have a distint change in the properties at its glass transition temperature (hereinafter Tg) and this change should occur over a small change in temperature of from about 5° to 10° centigrade. Given a resin of this type, the dispersion temperature should be set at a point slightly below the Tg of the resin to promote the stability of the dispersion. In this situation, it is believed that as the external electric field is applied and the particles migrate toward, and enter the influence of the appropriate electrode, the particles are heated to a temperature slightly above their Tg and they deposit as a tacky resin which flows into a smooth continuous coating. This ideal situation would provide an excellent coating with a minimum expenditure of energy.

Presently, it is within the abilities of one skilled in the art of polymer science to control the Tg of a resin, within limits, by the use of additives such as plasticizers, by the selection of monomers, and by controlling the polymerization conditions. In addition, it has been learned that the coulombic efficiency of the deposition process is also dependent upon the glass transition temperature of the depositing resin. In balancing these effects, it has been found that the optimum glass transition temperature of a composition lies between a $-30°$ C. and a $+30°$ C. when the bath is operating at or near room temperature.

An additional feature of the depositing resin which will affect the stability of the dispersion, the coulombic efficiency and the cross-link density of the final coating is the concentration of aminimide functionalities. The concentration of the aminimide has a direct effect on the stability of the dispersion since the concentration of charges on the discrete particles is directly related to the concentration of the aminimide groups. It has been found that if the concentration of aminimide functionalities is increased, a stable dispersion may be obtained at higher pH levels and that the coulombic efficiency will thereby be increased. This is to be expected, as it is believed that at the cathode, the depositing force is created by increasing the pH of the dispersion, in the immediate vicinity of the cathode, to a near neutral value of 7 and thereby destroying te stability of the dispersion and causing the particles to coalesce on the surface of the cathode. Conversely, if the concentration of the aminimide functionalities on the depositing composition is reduced, the pH of the dispersing medium will have to be significantly reduced to obtain a stable dispersion. This, of course, will decrease the coulombic efficiency of the deposition process. In addition to these effects, it is also obvious that the concentration of the aminimide and the active hydrogen functionality will directly effect the cross-link density in the final cured coating.

The potential of the electric field applied to the dispersion is another important parameter in the deposition process. At a given coulombic yield, a lower voltage will provide a more efficient process in terms of the total energy consumed. In addition, each aqueous electrodeposition system has a "rupture voltage" above which a continuous film is not produced because of gas evolving from the deposition surface. It is noted that the rupture voltage is dependent upon the temperature of the coating as it is deposited. The surface of a film, produced at voltages above the "rupture voltage", is literally cratered by the bubbles of evolving gas. However, as the applied voltage is reduced, the time necessary to deposit a coating of a given thickness, increases accordingly. The preferred voltage for the subject electro-deposition technique will fall within a range of from about 30 to 100 volts. This range is significantly below that recommended for other cationic electrodeposition processes which typically range from 150 to 250 volts and thus would allow the use of less expensive and less elaborate power supplies. However, higher voltages may be used with the subject compositions, if the aforementioned gas evolution problem does not destroy the continuity of the coating.

Film forming polymers used herein preferably contain both pendent aminimide functionalities and pendent active hydrogen functionalities disposed such that upon a postdeposition baking step, the isocyanate functionality produced by the thermal decomposition of the aminimide will form a cross-linking bridge by reacting with the active hydrogen containing functionality. However, it is to be noted that a suitable electrodepositable coating composition may be formed without the active hydrogen containing functionality. In this embodiment, a thermoplastic coating will be formed and the aminimide will serve only to form a stable dispersion and to provide the charge necessary for the particles to migrate to the appropriate electrode.

Preferable electrodepositable compositions are formed by copolymerizing a major portion of a film resin monomer such as an acrylic monomer with a vinyl monomer containing the aminimide functionality and vinyl monomer containing the active hydrogen functionality. The term film resin monomer is used herein to designate those monomers which will polymerize to form a film forming polymer and which constitute a major portion of the subject composition. Examples of such film resin monomers include:

1. Olefinic hydrocarbons, that is, monomers containing only atoms of carbon and hydrogen such as, ethylene, propylene, butylene, hexylene, isoprene, butadiene, styrene, alpha-methylstyrene, alpha-ethylstyrene, and the like.

2. Halogenated olefinic hydrocarbons, that is, monomers containing carbon, hydrogen and one or more halogen atoms, such as, vinyl chloride, vinylidene chloride, alpha-chlorostyrene, alpha-bromostyrene, di-chlorostyrene, 2-chloroprene, 2-chlorobutene, 2-chloropentene, 2-chlorohexene, fluoroethylene, 1,1 difluoroethylene, chlorobutadiene, and the like.

3. Esters of organic acids such as the preferred acrylics including: methylmethacrylate, ethylmethacrylate, propylmethacrylate, butylmethacrylate, amylmethacrylate, hexylmethacrylate, vinylacetate, vinylbutyrate, vinylpropionate, vinylp-chlorobenzoate, methylacrylate, ethylacrylate, propylacrylate, isopropylacrylate, butylacrylate, isobutylacrylate, amylacrylate, hexylacrylate, vinylalpha-chloroacetate, allylchloride, allylacetate, allylopropionate, allylbutyrate, allylacrylate, and the like.

4. Acrylonitriles such as acrylonitrile, methacrylonitrile, ethylacrylonitrile, and the like.

The aforementioned film resin monomers may be copolymerized with minor portions of vinyl aminimide monomers having the following structural formula:

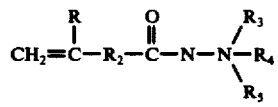

wherein R is H or lower alkyl ($C_1$–$C_6$), aryl, chlorine, fluorine, bromine, or cyano; $R_2$ is a lower alkyl having up to 20 carbon atoms and $R_3$ and $R_4$ are aliphatic or aryl hydrocarbon radicals having up to 22 carbon atoms, or radicals in which $R_3$ and $R_4$ are combined to form a heterocyclic ring with the nitrogen to which they are attached with the ring selected from the group consisting of pyrrolidiene, pyrrole, pyrroline, and piperidine and $R_5$ is a saturated or unsaturated aliphatic hydrocarbon having from 1 to 22 carbon atoms. The term aryl as employed herein is meant to define an aromatic radical in which the unsatisfied valance is at a carbon atom of the aromatic ring.

Another suitable vinyl aminimide monomer is described by the following structural formula:

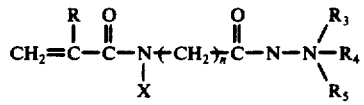

wherein R, $R_3$, $R_4$, and $R_5$ are as described above, X is alkyl, aryl, arylalkyl or cyclohydrocarbyl and *n is an integer of from* 1 to 4 inclusive. Monomers of this type are described in detail in U.S. Pat. No. 3,728,387.

It is noted that suitable vinyl monomers having pendent aminimide functionalities and their polymerization and copolymerization are disclosed in U.S. Pat. No. 3,527,802 and a list of such aminimides includes trimethylamine acrylimide, trimethylamine methacrylimide, dimethyl-ethylamine acrylimide, diethylmethylamine methacrylimide, triethylamine methacrylimide, dipropylmethylamine acrylimide, tributylamine acrylimide, phenyl-dimethylamine acrylimide, N-methylpyrrol acrylimide, N-methylpyrrol methacrylimide, N-ethylpyrroline acrylimide, N-ethylpyrroline methacrylimide, N-phenylpyrroline acrylimide, trimethylamine α-chloroacrylimide, trimethylamine ethacrylimide, trimethylamine α-phenylacrylimide, trimethylamine α-cyanoacrylimide, and triethylamine α-chloroacrylimide. This reference also includes a description of suitable polymerization and copolymerization reaction conditions.

In general, vinyl aminimide containing monomers will copolymerize in all ratios with vinyl monomers such as (1) acrylic monomers as defined by $CH_2 = CRCOOR_2$, wherein R is H, lower alkyl having up to 6 carbon atoms, aryl, chlorine, fluorine, bromine or cyano; and $R_1$ is —H, —$CH_3$ or lower alkyl having up to 20 carbon atoms, (2) vinyl esters, (3) vinyl halides, and (4) vinyl aromatic monomers. The copolymerization reactions may be carried out in bulk, in a compatible solvent, or in an emulsion using typical free radical initiators such as azo compounds or peroxides. The only special precaution that must be taken is to prevent the copolymerization reaction temperature from exceeding about 100° C., because the aminimide will begin to thermally decompose at an appreciable rate at that temperature. Preferably, the reaction temperature is less than 80° C.

Generally, vinyl aminimide monomers suitable for use in the subject composition are described by the following structural formula:

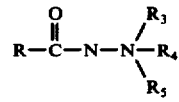

wherein R is an ethylenic unsaturated hydrocarbon radical which is copolymerizable with any of the aforementioned film resin monomers and $R_3$, $R_4$, and $R_5$ are described as above. It is to be noted that in using this aminimide that the aminimide functionality may be isolated from the vinyl group so as to not significantly effect the copolymerizability of the vinyl group (R).

Specific examples of available aminimide vinyl monomers include the following Ashland Chemical products.

| Ashland Aminimide 10301 | $CH_2{=}C(CH_3)CO\overset{\ominus}{N}\overset{\oplus}{N}(CH_3)_3$ |
|---|---|
| Ashland Aminimide 10302 | $CH_2{=}C(CH_3)CO\overset{\ominus}{N}\overset{\oplus}{N}(CH_3)_2CH_2CH_2OH$ |
| Ashland Aminimide 10303 | $CH_2{=}C(CH_3)CO\overset{\ominus}{N}\overset{\oplus}{N}(CH_3)_2CH_2\underset{CH_3}{\underset{|}{C}}HOH$ |
| Ashland Aminimide 10337 | $CH_2{=}C(CH_3)CO\overset{\ominus}{N}\overset{\oplus}{N}(CH_3)_2CH_2\underset{OH}{\underset{|}{C}}HCH_2O{-}C_4H_9$ |

A suitable active hydrogen containing vinyl monomer is described by the following structural formula:

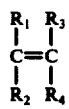

wherein $R_1$, $R_2$, and $R_3$ are H, $CH_3$ or lower alkyl, halogen, or cyano but not necessarily the same; and $R_4$ is a monovalent hydrocarbon radical having up to 20 carbon atoms and having an active hydrogen such as hydroxy, eposy, amine, amide, and urea. Examples of this type of monomer include hydroxylated acrylic esters such as hydroxymethylmethacrylate, hydroxyethylmethacrylate, hydroxybutylmethacrylate, and the like, epoxy containing monomers such as glycidylmethacrylate, and amide containing monomers such as acryl amide, aryl amide, aryl urea, N-ethylacrylicamide, and beta, N-N-diethylaminoethylmethacrylate.

A major portion of the subject electrodepositable composition will be the film forming addition polymer or mixtures thereof. Comparatively, the pendent aminimide and the pendent active hydrogen functionalities will constitute relatively minor portions of the total composition. Preferably, the concentrations of the pendent functionalities will be about equal and sufficient to provide a cross-link at an interval of from about 10 to about 100 film resin monomer units along the polymer molecule. However, it is to be noted, that a thermoplastic resin having no active hydrogen functionalities to form cross-linking bridges is within the scope of this invention. In this embodiment ther is suitably about one aminimide functionality per from about 10 to 200 film resin monomer units. Within this range the aminimide would provide sufficient charge to maintain a stable dispersion and an electrophoretic deposition process.

The dispersing medium used in the subject process is preferably water, however, any liquid medium that is compatible with both the dispersed resin and the deposition surface, and has a density near that of the dispersed resin would be suitable.

EXAMPLE I

In this exmaple, ethylacrylate and a vinylaminimide monomer, marketed by Ashland Chemical Company under the designation "aminimide 10303" were copolymerized in a solvent, acetonitrile, at 70° C. for six hours under a nitrogen atmosphere. The polymerizing formulation was, on a weight basis, as follows:

| 1. ethyl acrylate | 93% |
|---|---|
| 2. aminimide 10303 | 6% |
| 3. azobisisobutyronitrile (AIBN) | 1% |
| 4. t-dodecyl mercaptan | 0.2% |

The product of this addition polymerization reaction was an electrodepositable acrylic-based polymer having a peak molecular weight of about 30,000 as measured by gel permeation chromatography. This value is not a weighted average molecular weight, but rather simply that molecular weight of most plentiful species. Essentially, this is the molecular weight at the top of the distribution curve produced by the gel permeation chromatograph. In the polymer molecule polymerized in the above reaction and having a molecular weight of 30,000, there would be one aminimide group for about every 28 ethyl acrylate monomer units. It is to be noted that this particular polymer does not contain an active hydrogen species and therefore will form a thermoplastic coating.

After the polymerization, the actronitrile was stripped off under vacuum until the polymer solution or dispersion contained about 35% solids. This solution was then added with stirring to boiling, distilled water that contained about 10 ml of formic acid per 120 ml of water. This step formed a stable aqueous dispersion of cationic electrodepositable polymer particles having an average diameter of from about 1 to 10 microns. The pH of the dispersion was about 2 and the resistivity was 200 ohm cm. The total solids constituted about 6.8% by weight.

The subject dispersion was placed in an electrodeposition bath wherein the anode was formed by two ¼ inch carbon electrodes and the cathode was a flat piece of Bonderite EP-1 phosphated steel having a width and length of about 2 inches. The power source was a dc power supply with about 5% ripple, and the current was measured by recording the voltage across a low resistance shunt. The coulombic yield for this dispersion is tabulated below in Table I at two voltages and at various bath temperatures.

Table I

| Voltage | Bath Temperature | Coulombic Yield |
|---|---|---|
| v. | ° C. | (mg/coul) |
| 40 | 30.6 | 27.5 |
| 40 | 34.6 | 29.5 |
| 60 | 30.4 | 34.4 |
| 60 | 34.6 | 35.2 |

The coated electrodes were removed from the bath and dried. The coatings were coextensive with the electrodes and were also very smooth, attractive and strongly adhered to the substrate. The coulombic yields of the process using this dispersion were significantly higher than those of several commercially available electrodepositable resin tested and reported in Table II. In addition, the voltages required to deposit the subject resin were much lower.

Table II

|  | Voltage | Bath Temperature | Coulombic Yield |
|---|---|---|---|
|  |  | ° C. |  |
| ED-3000* Cathodic | 150 | 36 | 18.8 |
|  | 150 | 37.8 | 16.1 |
|  | 150 | 26.7 | 16.2 |
| ED-1124* Anodic | 150 | 25.0 | 26.4 |

Table II-continued

|  | Voltage | Bath Temperature | Coulombic Yield |
|---|---|---|---|
| ED-1036* Anodic | 100 | 25.0 | 10.8 |
| U32 KD020** | 250 | 15.4 | 21.6 |
| Anodic | 200 | 15.4 | 21.9 |

*available from PPG Industries
**available from Inmont Corporation

EXAMPLE II

In accordance with the procedure described in Example I, the following cross-linkable compositions were prepared, electrodeposited onto a metal cathode, and cured. The coatings were continuous, attractive and strongly adhered to the substrate.

| Formulation Number | Ingredients | | Molecular Weight (Peak) |
|---|---|---|---|
| 1. | ethyl acrylate | 92% | |
|  | aminimide 10303 | 6% | |
|  | AIBN | 1.0% | 48,000 |
|  | t-dodecyl mercaptan | 0.2% | |
|  | hydroxy ethyl methacrylate (HEMA) | 1.0% | |
| 2. | ethyl acrylate | 92% | |
|  | aminimide 10303 | 6% | |
|  | AIBN | 1.0% | 48,000 |
|  | HEMA | 1.0% | |
|  | t-dodecyl mercaptan | 0.13% | |
| 3. | ethyl acrylate | 90% | |
|  | aminimide 10303 | 5% | |
|  | HEMA | 4% | 66,000 |
|  | AIBN | 1% | |
|  | t-dodecyl mercaptan | 0.15% | |
|  | *dibutyl tin dilurate | 0.2% | |
| 4. | ethyl acrylate | 89% | |
|  | aminimide 10303 | 6% | |
|  | **glycidylmethacrylate (GMA) | 4% | 75,000 |
|  | AIBN | 1% | |
|  | ***t-dodecyl mercaptan | 0.13% | |

NOTES:
*The dibutyl tin dilurate was added to catalyze the post-deposition cross-linking reactions.
**The epoxy group on the GMA served as the active hydrogen containing species in this formulation, which produce an excellent coating.
***The mercaptan serves as a chain transfer agent during the polymerization to control the molecular weight.

While my invention has been described in terms of certain specific embodiments, it will be appreciated that other forms thereof could readily be adapted by one skilled in the art. Thereof, the scope of our invention is not to be limited to the specific embodiments disclosed.

What is claimed is:

1. A method of electrophoretically depositing a continuous resin coating on an electrode comprising the steps of:
    A. forming a stable dispersion comprising water and electrically charged resin particles having an average diameter of from 1 to 10 microns, and wherein the pH of said aqueous dispersing medium is maintained at least about 2 units from the neutral value of 7 by the presence of compatible organic acids or bases, said resin comprising:
        a. a major portion of a film forming addition polymer or mixtures thereof, and chemically bonded at random thereto;
        b. a minor portion of an aminimide pendent functionality, and
    B. applying a relatively constant voltage through electrodes in direct contact with said dispersion, and thereby depositiong continuous coating of said resin onto the electrode which has the charge opposite that of the charge on the particles.

2. A method of elecrophoretically deposition a cross-linked continuous resin coating on an electrode comprising the steps of:
    A. forming a stable liquid dispersion comprising water and electrically charged resin particles having an average diameter of from 1 to 10 microns and wherein the pH of said aqueous dispersing medium is maintained at least about 2 units from the neutral value of 7 by the presence of compatible organic acids or bases, said resin comprising:
        a. a major portion of a film forming addition polymer or mixtures thereof, and chemically bonded at random thereto;
        b. a minor portion of an aminimide pendent functionality;
        c. a minor portion of an active hydrogen containing pendent functionality, and
    B. applying a relatively constant voltage through electrodes in direct contact with said dispersion, and thereby depositing said continuous coating onto the electrodes which has the charge opposite that of the charge on the particles;
    C. removing the coated electrode from contact with said dispersion;
    D. baking said coated electrode at a temperature of at least about 110° C. thereby forming said cross-linked continuous coating.

3. A method of electrophoretically depositing a continuous cross-linked resin coating on a cathode comprising the steps of:
    A. forming a stable liquid dispersion comprising water and electrically charged resin particles having an average diameter of from about 1 to about 10 microns wherein said dispersion the pH is maintained in the range of from about 2 to about 6 by the presence of a compatible organic acid, said resin comprising a film forming acrylic polymer or mixture thereof and chemically bonded at random thereto pendent aminimide functionalities and pendent active hydrogen functionalities;
    B. contacting said dispersion with a cathode and an anode which are spaced apart and connected to a dc power source;
    C. applying a relatively constant voltage, to said dispersion through the cathode and anode and thereby depositing a continuous coating of said resin onto the cathode;
    D. removing said coated cathode, and
    E. baking said coated cathode at at temperature of at least 110° C. to cure said resin and form said cross-linked coating.

4. A method of electrophoretically depositing a decorative and protective coating on a negatively charged metallic substrate comprising the steps of:
    A. forming a stable aqueous dispersion of positively charged film forming resin particles having an average size of from 1 to 10 microns, said resin being the addition copolymerization product of:
        a. a major portion of an acrylic film resin monomer having the following structural formula;

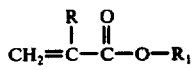

wherein R is H or a lower alkyl group having up to 6 carbon atoms and $R_1$ is H or a lower alkyl group having up to 20 carbon atoms and wherein said major portion may be mixtures of the above monomers, and b. a minor portion of one or more active hydrogen containing acrylic monomers having the following structural formula:

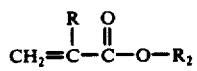

wherein R is H or lower alkyl having up to 6 carbon atoms and $R_2$ is an aliphatic alkyl group having up to 20 carbon atoms and bonded thereto an active hydrogen containing functionality, and c. a minor portion about equal to that of (b) of one or more acrylic aminimide containing monomers having the following formula:

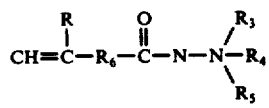

wherein R is H or lower alkyl having up to 6 carbon atoms, $R_6$ is omitted, or a lower alkyl divalent group having up to 20 carbon atoms, or

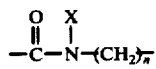

wherein X is H, alkyl, aryl, arylalkyl, or cyclohydrocarbyl and $n$ is an integer from 1 to 4, and $R_3$ and $R_4$ are alkyl or aryl hydrocarbon radicals having from 1 to 22 carbon atoms or radicals in which $R_3$ and $R_4$ are combined to form heterocyclic rings with nitrogen to which they are attached and $R_5$ is a saturated or unsaturated aliphatic radical of from 1 to 22 carbon atoms, said active hydrogen containing monomer and said aminimide containing monomer being present in sufficient quantities to provide cross-linking bridges in said copoylmerization product upon subsequent baking at an average interval of from about every 10 to about every 100 acrylic film resin monomer units, and the pH of said dispersion being maintained in the range of from about 2 to about 6 by the presence of a compatible organic acid;

B. immersing said substrate in said dispersion, and applying a relatively constant voltage of at least 30 volts to said dispersion through said substrate which substrate is negatively charged and thereby depositing a coating of said resin on said substrate;

C. removing said coated substrate from said dispersion and heating it to a temperature of at least 110° C. to cross-link said coating.

* * * * *